United States Patent
Kanatzidis et al.

(10) Patent No.: US 9,056,263 B2
(45) Date of Patent: Jun. 16, 2015

(54) CHALCOGENIDE COMPOUNDS FOR THE REMEDIATION OF NUCLEAR AND HEAVY METAL WASTES

(75) Inventors: Mercouri G. Kanatzidis, Wilmette, IL (US); Joshua L. Mertz, Evanston, IL (US); Emmanouil Manos, Nicosia (CY)

(73) Assignee: Northwestern University, Evanston, IL (US)

( * ) Notice: Subject to any disclaimer, the term of this patent is extended or adjusted under 35 U.S.C. 154(b) by 1221 days.

(21) Appl. No.: 13/114,227

(22) Filed: May 24, 2011

(65) Prior Publication Data

US 2011/0290735 A1    Dec. 1, 2011

Related U.S. Application Data

(60) Provisional application No. 61/347,903, filed on May 25, 2010.

(51) Int. Cl.
| | |
|---|---|
| *C10G 29/04* | (2006.01) |
| *B01D 15/02* | (2006.01) |
| *B01J 20/02* | (2006.01) |
| *B01J 20/04* | (2006.01) |
| *B01J 20/30* | (2006.01) |
| *B01J 39/02* | (2006.01) |
| *B01J 39/08* | (2006.01) |
| *B01J 47/00* | (2006.01) |
| *B01J 47/02* | (2006.01) |
| *C02F 1/28* | (2006.01) |

(Continued)

(52) U.S. Cl.
CPC .............. *B01D 15/02* (2013.01); *B01J 20/02* (2013.01); *B01J 20/0251* (2013.01); *B01J 20/0259* (2013.01); *B01J 20/0262* (2013.01); *B01J 20/045* (2013.01); *B01J 20/3085* (2013.01); *B01J 39/02* (2013.01); *B01J 39/08* (2013.01); *B01J 47/001* (2013.01); *B01J 47/02* (2013.01); *C02F 1/281* (2013.01); *C02F 2101/006* (2013.01); *C02F 2101/20* (2013.01); *C10G 25/02* (2013.01); *C10G 2300/1033* (2013.01); *C10G 2300/205* (2013.01); *G21F 9/12* (2013.01); *C10G 2300/1025* (2013.01); *B01J 20/0285* (2013.01)

(58) Field of Classification Search
CPC ....... C10G 25/00; C10G 19/00; C10G 19/073; C10G 31/08
USPC .................................. 208/251, 283, 284, 289
See application file for complete search history.

(56) References Cited

U.S. PATENT DOCUMENTS

| | | |
|---|---|---|
| 4,040,917 A | 8/1977 | Whittingham |
| 4,159,962 A | 7/1979 | Di Salvo et al. |

(Continued)

OTHER PUBLICATIONS

Kanatzidis et al, New layered componds though polysulfide flux synthesis; A2SN4S9, present a new form of the [Sn4S9]2-network, 1998, Journal of Solid state Chemistry , 141, 17-28.*

(Continued)

*Primary Examiner* — Randy Boyer
*Assistant Examiner* — Juan Valencia
(74) *Attorney, Agent, or Firm* — Bell & Manning, LLC (57) ABSTRACT

Chalcogenide compounds, including ternary and quaternary tin and antimony chalcogenides, for use as absorbents in the remediation of hazardous materials are provided. Also provided are methods for using the chalcogenides in the remediation of ionic and elemental metals from aqueous and non-aqueous fluids.

16 Claims, 4 Drawing Sheets

(51) Int. Cl.
*C10G 25/02* (2006.01)
*G21F 9/12* (2006.01)
*C02F 101/00* (2006.01)
*C02F 101/20* (2006.01)

(56) References Cited

U.S. PATENT DOCUMENTS

| | | | |
|---|---|---|---|
| 5,531,936 | A | 7/1996 | Kanatzidis et al. |
| 6,350,372 | B1 * | 2/2002 | Degnan et al. ............ 208/251 R |
| 2008/0145305 | A1 | 6/2008 | Kanatzidis et al. |
| 2009/0095684 | A1 * | 4/2009 | Kanatzidis et al. ........... 210/688 |

OTHER PUBLICATIONS

Manos et al., Layered metal sulfides: Exceptionally selective agents for radioactive strontium removal, PNAS, Mar. 11, 2008, pp. 3696-3699, vol. 105, No. 10.

Ding et al., Permeable layers with large windows in [$(CH_3CH_2CH_2)_2NH_2]_5In_5Sb_6S_{19}$•$1.45H_2O$: High ion-exchange capacity, size discrimination, and selectivity for Cs ions, Chem Mater, Jul. 17, 2007, pp. 3867-3869, vol. 19.

Divigalpitiya et al., Inclusion systems of organic molecules in restacked single-layer molybdenum disulfide, Science, Oct. 20, 1989, pp. 369-371, vol. 246.

Clement et al., Organometallic intercalates of the layered transition-metal dichalcogenides $TaS_2$ and $ZrS_2$, Inorg Chem, 1978, pp. 2754-2758, vol. 17, No. 10, American Chemical Society.

Heising et al., Exfoliated and restacked $MoS_2$ and $WS_2$: Ionic or neutral species? Encapsulation and ordering of hard electropositive cations., J Am Chem Soc, Dec. 4, 1999, pp. 11720-11732, vol. 121.

Dungey et al., Structural characterization and thermal stability of $MoS_2$ intercalation compounds, Chem Mater, Jul. 11, 1998, pp. 2152-2161, vol. 10.

Bortun et al., Evaluation of Synthetic Inorganic Ion Exchangers for Cesium and Strontium Removal from Contaminated Groundwater and Wastewater, Solvent Extr. Ion Exch., 1997, pp. 909-929, vol. 15, No. 5.

Sylvester et al., The Removal of Strontium and Cesium from simulated Hanford Groundwater Using Inorganic Ion Exchange Materials, Solvent Extr. Ion Exch., 1998, pp. 1527-1539, vol. 16, No. 6.

Bortun et al., Synthesis, Characterization, and Ion Exchange Behavior of a Framework Potassium Titanium Trisilicate $K_2TiSi_3O_9$•$H_2O$ and Its Protonated Phases, Chem. Mater., Jan. 13, 2000, pp. 294-305, vol. 12, No. 2.

Möller et al., Update of $^{85}Sr$, $^{134}Cs$ and $^{57}Co$ by antimony silicates doped with $Ti^{4+}$, $Nb^{5+}$, $Mo^{6+}$ and $W^{6+}$, J. Mater. Chem., 2001, pp. 1526-1532, vol. 11.

Mercier et al., Access in Mesoporous Materials: Advantages of a Uniform Pore Structure in the Design of a Heavy Metal Ion Adsorbent for Environmental Remediation, Adv. Mater., 1997, pp. 500-503, vol. 9, No. 6.

Feng et al., Functionalized Monolayers on Ordered Mesoporous Supports, Science, May 9, 1997, pp. 923-926, vol. 276.

Gash et al., Efficient Recovery of Elemental Mercury from Hg(II)-Contaminated Aqueous Media Using a Redox-Recyclable Ion-Exchange Material, Environ. Sci. Technol., 1998, pp. 1007-1012, vol. 32, No. 7.

* cited by examiner

CHALCOGENIDE COMPOUNDS FOR THE REMEDIATION OF NUCLEAR AND HEAVY METAL WASTES

CROSS-REFERENCE TO RELATED APPLICATIONS

This patent application claims priority from U.S. provisional patent application No. 61/347,903, filed on May 25, 2010, the entire disclosure of which is incorporated herein by reference.

STATEMENT OF GOVERNMENT RIGHTS

This invention was made with government support under DMR-0801855 awarded by National Science Foundation. The government has certain rights in the invention.

BACKGROUND

The disposal of nuclear waste discharged with the spent fuel from a fission nuclear power plant is one of the most important environmental safety issues faced by the nuclear power industry. This issue is hindering the use of nuclear power in a safe, abundant, efficient, and proliferation-resistant manner. Isotopes responsible for the majority of the external gamma exposure in fuel reprocessing plants are $^{137}Cs$ and $^{90}Sr$ in the form of dissolved ions. High level waste (HLW) contains primarily the fission radionuclides $^{137}Cs$ and $^{90}Sr$ and very small amounts of transuranic radionuclides. (See, "Development of matrices for vitrification of strontium and cesium concentrate from high-level waste"; Aloi, A. S.; Trofimenko, A. V.; Iskhakova, O. A.; Kolycheva, T. I.; *Radiochemistry* 1997, 39, 567-573; "Cesium removal demonstration using selected actual waste samples from the Hanford reservation tank farm"; Peterson, R. A.; Fiskum, S. K.; Arm, S. T.; Blanchard, D. L.; *Separation Science and Technology* 2006, 41, 2361-2371; and "Demonstration of the caustic-side solvent extraction process for the removal of (CS)—C-137 from Savannah River Site high level waste"; Norato, M. A.; Beasley, M. H.; Campbell, S. G.; Coleman, A. D.; Geeting, M. W.; Guthrie, J. W.; Kennell, C. W.; Pierce, R. A.; Ryberg, R. C.; Walker, D. D.; Law, J. D.; Todd, T. A.; *Separation Science and Technology* 2003, 38, 2647-2666.) Various processes exist to convert HLW into a variety of forms including alkaline or acidic supernatant liquid, sludge, salt cake, or calcine solid, however, further improvements and breakthroughs are necessary to resolve this issue.

Cesium is often removed from waste waters in the nuclear industry by means of solid ion-exchangers, ranging from organic polymers (see, "The universal solvent extraction (UNEX) process. II. Flowsheet development and demonstration of the UNEX process for the separation of cesium, strontium, and actinides from actual acidic radioactive waste"; Law, J. D.; Herbst, R. S.; Todd, T. A.; Romanovskiy, V. N.; Babain, V. A.; Esimantovskiy, V. M.; Smirnov, I. V.; Zaitsev, B. N.; *Solvent Extraction and Ion Exchange* 2001, 19, 23-36; and "Selective transport of cesium and strontium ions through polymer inclusion membranes containing calixarenes as carriers"; Arena, G.; Contino, A.; Magri, A.; Sciotto, D.; Lamb, J. D.; *Supramolecular Chemistry* 1998, 10, 5-15), compounds (see, "Decontamination of high-level waste using a continuous precipitation process"; Peterson, R. A.; Burgess, J. O.; Walker, D. D.; Hobbs, D. T.; Serkiz, S. M.; Barnes, M. J.; Jurgensen, A. R.; *Separation Science and Technology* 2001, 36, 1307-1321) and macrocycles (see, "A robust alkaline-side CSEX solvent suitable for removing cesium from Savannah River high level waste"; Bonnesen, P. V.; Delmau, L. H.; Moyer, B. A.; Leonard, R. A.; *Solvent Extraction and Ion Exchange* 2000, 18, 1079-1107; and "Actinide, strontium, and cesium removal from Hanford radioactive tank sludge"; Lumetta, G. J.; Wagner, M. J.; Carlson, C. D.; *Solvent Extraction and Ion Exchange* 1996, 14, 35-60) to inorganic solids such as zeolites (see, "The effect of amorphization on the Cs ion exchange and retention capacity of zeolite-NaY"; Gu, B. X.; Wang, L. M.; Ewing, R. C.; *Journal of Nuclear Materials* 2000, 278, 64-72; "Ion exchange selectivity of phillipsite for Cs and Sr as a function of framework composition"; Adabbo, M.; Caputo, D.; de Gennaro, B.; Pansini, M.; Colella, C.; *Microporous and Mesoporous Materials* 1999, 28, 315-324; "The removal of strontium and cesium from simulated hanford groundwater using inorganic ion exchange materials"; Sylvester, P.; Clearfield, A.; *Solvent Extraction and Ion Exchange* 1998, 16, 1527-1539; "Adsorption Behavior of Cesium and Strontium on Synthetic Zeolite-P"; Mimura, H.; Akiba, K.; *Journal of Nuclear Science and Technology* 1993, 30, 436-443; "Removal of Heat-Generating Nuclides from High-Level Liquid Wastes through Mixed Zeolite Columns"; Mimura, H.; Akiba, K.; Igarashi, H.; *Journal of Nuclear Science and Technology* 1993, 30, 239-247; and "Distribution and Fixation of Cesium and Strontium in Zeolite-a and Chabazite"; Mimura, H.; Kanno, T.; *Journal of Nuclear Science and Technology* 1985, 22, 284-291).

Inorganic ion exchangers possess a number of advantages as $Sr^{2+}$ and $Cs^+$ adsorbents over conventional organic ion-exchange resins, including superior chemical, thermal and radiation stability. (See, "Ion exchange properties of a cesium ion selective titanosilicate"; Bortun, A. I.; Bortun, L. N.; Clearfield, A.; *Solvent Extraction and Ion Exchange* 1996, 14, 341-354; and "Highly selective inorganic crystalline ion exchange material for $Sr^{2+}$ in acidic solutions"; Nenoff, T. M.; Miller, J. E.; Thoma, S. G.; Trudell, D. E.; *Environmental Science & Technology* 1996, 30, 3630-3633). Because the primary chemical components of alkaline supernatants are sodium nitrate and sodium hydroxide, the majority of these could be disposed of as low level waste if radioactive $^{137}Cs$ could be selectively removed. However, recovery of long lived radionuclides from waste solutions containing large concentrations of salt has been a challenging task. Up to now solutions based on organic crown ethers (and macrocycles) and inorganic oxide ion-exchange materials (such as clays, zeolites, alkali metal titanium silicates, manganese oxides, etc.), liquid ionic technologies have been tested and have been moderately effective. (See, "The effect of amorphization on the Cs ion exchange and retention capacity of zeolite-NaY"; Gu, B. X.; Wang, L. M.; Ewing, R. C.; *Journal of Nuclear Materials* 2000, 278, 64-72; "Selective exchange and fixation of strontium ions with ultrafine Na-4-mica"; Kodama, T.; Harada, Y.; Ueda, M.; Shimizu, K.; Shuto, K.; Komarneni, S.; *Langmuir* 2001, 17, 4881-4886; "Sorption of Am(III), U(VI) and Cs(I) on sodium potassium fluorophlogopite, an analogue of the fluorine mica mineral"; Saxena, A.; Tomar, R.; Murali, M. S.; Mathur, J. N.; *Journal of Radioanalytical and Nuclear Chemistry* 2003, 258, 65-72; "Separation of cesium and strontium by potassium nickel hexacyanoferrate(II)-loaded zeolite A"; Mimura, H.; Kimura, M.; Akiba, K.; Onodera, Y.; *Journal of Nuclear Science and Technology* 1999, 36, 307-310; "Integrated experimental and computational methods for structure determination and characterization of a new, highly stable cesium silicotitanate phase, $Cs_2TiSi_6O_{15}$ (SNL-A)"; Nyman, M.; Bonhomme, F.; Teter, D. M.; Maxwell, R. S.; Gu, B. X.; Wang, L. M.; Ewing, R. C.; Nenoff, T. M.; *Chemistry of Materials* 2000, 12, 3449-3458; "Chromatographic-Separation of Strontium and Cesium with Mixed Zeolite Column"; Mimura, H.; Kobayashi, T.; Akiba, K.; *Journal of Nuclear Science and Technology* 1995, 32, 60-67; "Separation of Heat-Generating Nuclides from High-Level Liquid Wastes through Zeolite Columns"; Mimura, H.; Akiba, K.; *Journal of Nuclear Science and Technology* 1994, 31, 463-469; "Titanium silicates, $M_3HTi_4O_4(SiO_4)_3 4H_2O$ ($M=Na^+$, $K^+$), with three-dimensional tunnel structures for the selective removal of strontium and cesium from wastewater solutions"; Behrens, E. A.; Clearfield, A.; *Microporous Materials* 1997, 11, 65-75; "Syntheses, crystal structures, and ion-exchange properties of porous titanosilicates, $M_3HTi_4O_4(SiO_4)_3 4H_2O$ ($M=H^+$, $K^+$, $Cs^+$), structural analogues of the mineral pharmacosiderite"; Behrens, E. A.; Poojary, D. M.; Clearfield, A.; *Chemistry of Materials* 1996, 8, 1236-1244; "Sorption behavior of radionuclides on crystalline synthetic tunnel manganese oxides"; Dyer, A.; Pillinger, M.; Newton, J.; Harjula, R.; Moller, T.; Amin, S.; *Chemistry of Materials* 2000, 12, 3798-3804; and "Layered metal sulfides: Exceptionally selective agents for radioactive strontium removal"; Manos, M. J.; Ding, N.; Kanatzidis, M. G.; *Proceedings of the National Academy of Sciences of the United States of America* 2008, 105, 3696-3699.) There are, however, drawbacks to these approaches including cost, stability and selectivity.

The compounds $A_{2x}M_xSn_{3-x}S_6$ (x=0.1-0.95; $A=Li^+$, $Na^+$, $K^+$, $Rb^+$; $M=Mn^{2+}$, $Mg^{2+}$, $Zn^{2+}$, $Fe^{2+}$) (e.g., "KMS") have been reported as agents for radioactive strontium removal. (See, "Layered metal sulfides: Exceptionally selective agents for radioactive strontium removal"; Manos, M. J.; Ding, N.; Kanatzidis, M. G.; *Proceedings of the National Academy of Sciences of the United States of America* 2008, 105, 3696-3699.) However, it would be helpful to have additional compounds for remediation applications.

Like nuclear waste, heavy metal contamination in water poses a significant environmental hazard. Mercuric ($Hg^{2+}$) and other soft heavy metal ions such as $Cd^{2+}$ and $Pb^{2+}$ represent major contaminants in natural water sources and industrial waste water and constitute a threat for humans and other species. (See, T. W. Clarkson in *Heavy metals in the environment* (Ed.: B. Sarkar) Marcel Dekker Inc., 2002, pp. 457-502.) Conventional ion-exchangers such as zeolites and clays and adsorbents, such as activated carbon generally have low selectivity and weak binding affinity for soft metal ions. (See, G. Blanchard, M. Maunaye, G. Martin, *Water Res.* 1984, 18, 1501-1507; A. Benhammou, A. Yaacoubi, L. Nibou, B. Tanouti, *J. Colloid. Interface Sci.* 2005, 282, 320-326; and C. P. Huang, D. W. Blankenship, *Water Res.* 1984, 18, 37-46.) Thiol-functionalized adsorbents, including clays, resins, organoceramics and mesoporous silicates, are considered the most effective sorbents for soft heavy metal ions and in particular for $Hg^{2+}$. (See, R. Celis, M. C. Hermosin, J. Cornejo, *Environ. Sci. Technol.* 2000, 34, 4593-4599; I. L. Lagadic, M. M. Mitchell, B. D. Payne, *Environ. Sci. Technol.* 2001, 35, 984-990; S. Chiarle, M. Ratto, M. Rovvati, *Water Res.* 2000, 34, 2971-2978; D. Kara, *Anal. Let.* 2005, 38, 2217-2230; A. M. Nam, L. L. Tavlarides, *Solvent Extract. Ion. Exch.* 2003, 21, 899-913; J. S. Lee, S. Gomez-Salazar, L. L. Tavlarides, *React. Funct. Polym.* 2001, 49, 159-172; A. M. Nam, S. Gomez-Salazar, L. L. Tavlarides, *Ind. Eng. Chem. Res.* 2003, 42, 1955-1964; X. Feng, G. E. Fryxell, L.-Q. Wang, A. Y. Kim, J. Liu, K. M. Kemner, *Science* 1997, 276, 923-926; J. Liu, X. Feng, G. E. Fryxell, L.-Q Wang, A. Y. Kim, M. Gong, *Adv. Mater.* 1998, 10, 161-165; X. Chen, X. Feng, J. Liu; G. E. Fryxell, M. Gong, *Sep. Sci. Technol.* 1999, 34, 1121-1132; L. Mercier, T. J. Pinnavaia, *Adv. Mater.* 1997, 9, 500-503; L. Mercier, T. J. Pinnavaia, *Environ. Sci. Technol.* 1998, 32, 2749-2754; J. Brown, L. Mercier, T. J. Pinnavaia, *Chem. Commun.* 1999, 69-70; C.-C Chen, E. J. McKimmy, T. J. Pinnavaia, K. F. Hayes, *Environ. Sci. Technol.* 2004, 38, 4758-4762; S. J. L. Billinge, E. J. McKimmy, M. Shatnawi, H. Kim, V. Petkov, D. Wermeille, T. J. Pinnavaia, *J. Am. Chem. Soc.* 2005, 127, 8492-8498; J. Brown, R. Richer, L. Mercier, *Microp. Mesop. Mater.* 2000, 37, 41-48; L. Mercier, C. Detellier, *Environ. Sci. Technol.* 1995, 29, 1318-1323.) In addition, mesoporous carbon materials with thiopyrene functional groups were proven to be excellent sorbents for mercuric ions. (See, Y. S. Shin, G. Fryxell, W. Y. Um, K. Parker, S. V. Mattigod, R. Skaggs, *Adv. Funct. Mater.* 2007, 17, 2897-2901.) More recently, iron oxide nanoparticles coated with humic acid showed remarkable capability to remove heavy metal ions ($Hg^{2+}$, $Pb^{2+}$, $Cd^{2+}$, $Cu^{2+}$) from water. (See, J.-F. Liu, Z.-S Zhao, G.-B. Jiang, *Environ. Sci. Technol.* 2008, 42, 6949-6954.) However, additional and improved waste water remediation compounds for heavy metal contamination are desired.

Crude oil and unprocessed gas can contain significant amounts of elemental mercury and chemically bound mercury. Raw produced hydrocarbon liquids also contain organic mercury compounds that partition into particular product streams in distillations and separations. Mercury is harmful to petroleum handling and processing systems because in gas processing, mercury can damage equipment, including cryogenic heat exchangers. Also, mercury poisons catalysts and becomes a component of waste water, which negatively impacts regulatory compliance. (See Wilhelm, S M; Bloom, N *Fuel Processing Technology* 2000, 63, 1-27; Wilhelm S M, Liang L, Cussen D, et al. *Environmental Science & Technology*, 2007, 41, 4509-4514).

Crude oil typically contains several chemical species of mercury, which differ in their chemical and physical properties. These include elemental mercury, organic mercury compounds (e.g., $R_2Hg$ and RHgX, where $R=CH_3$, $C_2H_5$, etc., and $X=Cl^-$, etc.) and salts of the $Hg^{2+}$ ion. The latter are soluble in oil and gas condensate but preferentially partition into the water phase in primary separations. Mercuric chlorides and halides have a reasonably high solubility in organic liquids (order of magnitude more than elemental mercury). (Bloom, N. S. Fresenius' *J. Anal. Chem.* 2000, 366(5):438. Wilhelm, S., and N. Bloom. *Fuel Proc. Technol.* 2000, 63:1).

SUMMARY

The present invention provides methods for the remediation of fluid samples. The methods comprise exposing a fluid sample comprising metal ions to an ion exchange medium comprising a chalcogenide compound having the formula $(A_xB_{x'})M_yQ_z$, where A is an alkali cation or an alkylammonium cation; B is an alkaline earth cation; M is Sn, Zn, P, Cu or Sb; and Q is S or Se, wherein the values of x, y and z can be the same or different; x, x' and y can range, independently, from 0 to 9, provided that if one of x and x' is zero, the other is not; and z can range from 1 to 25. In the present methods, the chalcogenide compounds absorb the metal, which can then be removed from the fluid sample.

The chalcogenide compounds can be used to remove a variety of metal ions from a fluid (e.g., liquid or gas) sample, including ions of metals that pose an environmental and/or health risk. Thus, examples of fluid samples that can be remediated by the present methods include, waste water generated from a nuclear reactor or an industrial plant. Examples of metal ions that can removed from the liquid samples include radionuclide ions, such as isotopes of Cs and Sr (e.g., $^{137}Cs$ and $^{90}Sr$), and heavy metal ions, such as mercury, lead, cadmium, cobalt, nickel, copper, gold, silver, platinum, palladium, and thallium ions. In addition, the chalcogenide compounds can be used to remove elemental metals, such as mercury, from a fluid sample, such as a hydrocarbon-based liquid or gas.

The amount of metal removed from the fluid sample will depend on the initial concentration of the metal in the sample, the amount of chalcogenide compound in the absorption medium, the nature of the metal and the chalcogenide compounds, and/or the time of exposure. In some embodiments of the present methods, at least 50 percent by weight of the metal is removed from the sample. This includes embodiments in which at least 70 percent by weight, at least 90 percent by weight, and at least 99 percent by weight of the metal is removed from the sample.

BRIEF DESCRIPTION OF THE DRAWINGS

FIG. 1. (a) is a diagram of a part of the layer framework of $K_2Sn_4S_9$ ("KTS-1") viewed down the c-axis. The Sn and S atoms are represented by light gray (tetrahedrally coordinated) and darker gray balls respectively; (b) is a diagram of the structure, with a polyhedral representation of the layers, along the b-axis. Disordered $K^+$ ions (black balls) are hosted in the interlayer and pore spaces.

FIG. 2. (a) shows a part of the layer framework of $K_2Sn_2S_5$ ("KTS-2") viewed down the b-axis. The Sn and S atoms are represented by dark gray and medium gray balls respectively; (b) is a diagram of the structure, with a polyhedral representation of the pore structure. $K^+$ ions (larger, light gray balls) are hosted in the pore spaces in both (a) and (b).

DETAILED DESCRIPTION

The present invention relates to compounds for the use as absorbents for the remediation of various hazardous materials. More specifically, the present invention relates to the use of ternary and quaternary chalcogenides, including tin and antimony chalcogenides, as absorbents in remediation applications. In some embodiments, the compounds can be used as ion exchange materials for absorbing metal ions, including heavy metal ions from aqueous or non-aqueous fluids, such as waste water streams. Metal ions that can be exchanged with the present chalcogenides include $Cs^+$, $Hg^{2+}$, $MeHg^{2+}$, $Cd^{2+}$, $Pb^{2+}$, $Co^{2+}$, $Ni^{2+}$, $Cu^{2+}$, $Pt^{2+}$, $Pd^{2+}$, $Sr^{2+}$, $Au^+$, $Ag^+$ and $Tl^+$ ions. In other embodiments, the compounds can be used to remove elemental metals, such as mercury, from aqueous or non-aqueous fluids, including hydrocarbon fluids such as petroleum, crude oil or natural gas (methane).

The chalcogenides can be represented by the formula: $(A_xB_{x'})M_yQ_z$, where A is an alkali cation or an alkylammonium cation; B is an alkaline earth cation; M is Sn, Zn, P, Cu or Sb; and Q is S or Se. The x, y and z can be the same or different and x and y can range from 0 to 9, provided that if one of x and x' is zero, the other is not. The value of z can range from 1 to 25; For example, A can be Li, Na, K, Rb, Cs, or $[R_{4-x}NH_x]^+$, where R=an alkyl group, such as methyl, ethyl, propyl, butyl, and the like, and B can be Mg, Ca, Sr, or Ba. The compounds contain many differing structure types, including layered and porous materials having a three dimensional open-framework. When used to remove ions from aqueous waste, these materials can have comparable or better performance and selectivity than benchmark materials, such as ion-exchange resins and functionalized silicas, zeolites and clays.

In one embodiment of the present invention, the compounds have the formula $A_xM_yQ_z$ (i.e., x'=0), where x and y can range from 1 to 9 (e.g., from 2 to 9) independently and z can range from 1 to 20. The selectivity of $A_xM_yQ_z$ compounds can be attributed to their chalcogenide surfaces, which have much larger binding affinities for softer ions than those of the traditional oxide frameworks. The presence of the soft chalcogen ligands of the chalcogenides can induce innate selectivity for softer heavier metal ions and against hard ions such as $Na^{2+}$ or $Ca^{2+}$. In addition, the pores in some of the structures can influence the selectivity of one ion over the other. These properties are particularly useful for ion discrimination in nuclear wastes or waste water with heavy metal ion contaminants.

Non-limiting examples of tin and antimony chalcogenide compounds falling within this category include those having the formulas: $A_2Sn_2Q_z$, where z is in the range from 6 to 20; $A_2Sn_4Q_z$, where z is in the range from 10 to 19; $A_2Sb_4Q_z$, where z is in the range from 8 to 22; and $A_2Sb_8Q_z$, where z is in the range from 14 to 23. Non-limiting examples of phosphorus chalcogenide compounds falling within this category include those having the formulas: $A_2P_2Q_z$, where z is in the range from 7 to 21; and $APQ_z$, wherein z is in the range from 7 to 16.

Two specific embodiments of the present chalcogenide compounds that can be used to illustrate, but not to limit, the present invention are $K_2Sn_4S_9$ and $K_2Sn_2S_5$. $K_2Sn_4S_9$ is an example of a layered material that undergoes ion-exchange with several ions. The structure of $K_2Sn_4S_9$ is shown in FIGS. 1(a) and 1(b). As shown in these figures, edge sharing and corner sharing $SnS_4$ tetrahedra, where the S atoms are always three-coordinated, build up the layer. The $A^+$ ions intercalated between the layers are positionally disordered and easily exchangeable for a variety of cations.

Figure 1:
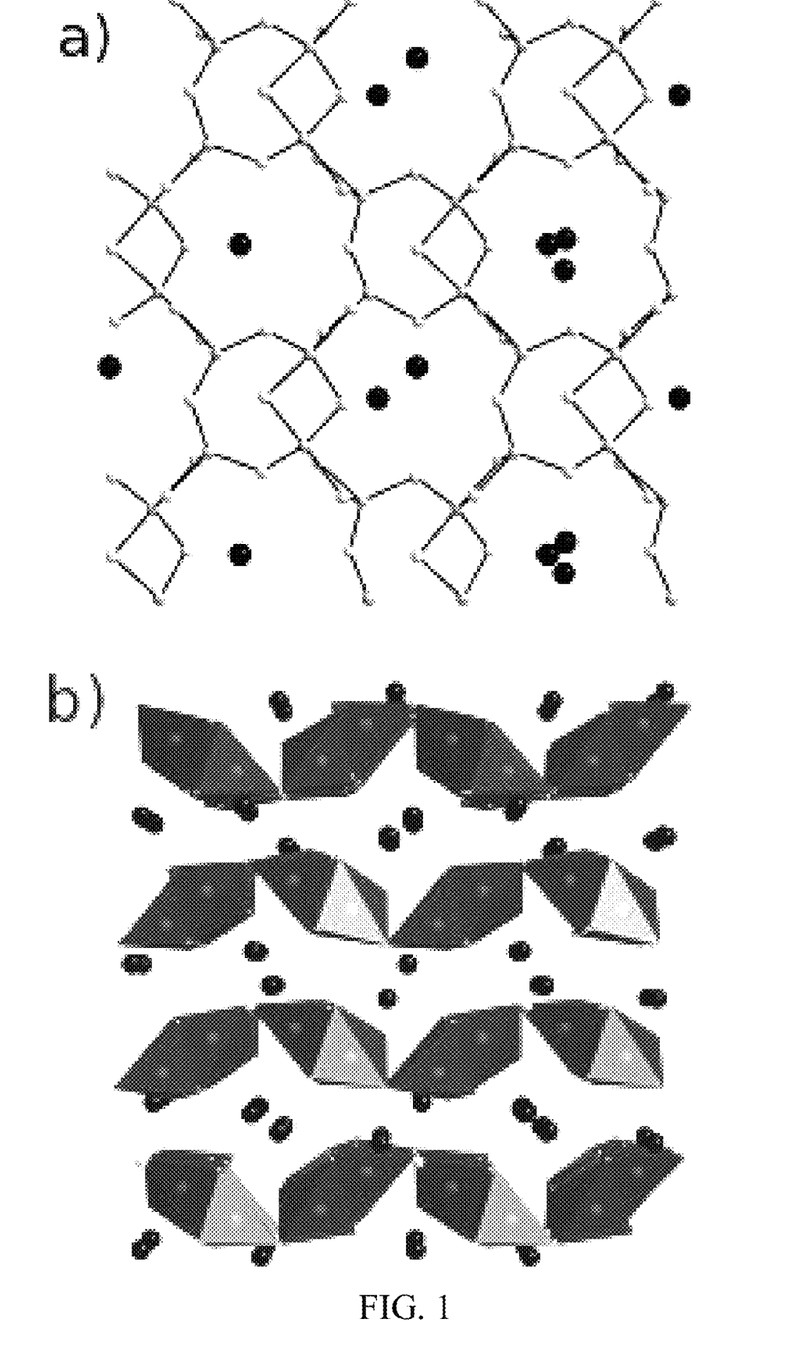

The basic building block of these layers is the $Sn_4S_9$ cluster which is composed of two tetrahedral $SnS_4$ and two trigonal pyramidal $SnS_3$ units fused into the larger unit through edge- or corner-sharing of sulfur atoms. These $Sn_4S_9$ clusters associate into layers by coordinating to each other via intercluster Sn—S bonds. Each $Sn_4S_9$ fragment is connected to four others in a nearly face-centered arrangement through $(\mu\text{-S})_2$ bridges forming the overall $[Sn_4S_9]^{2-}$ layer found in both compounds. The intercluster Sn—S bonds give rise to the observed five-coordinate as well as tetrahedral tin centers in the layer (FIG. 1).

Figure 2:
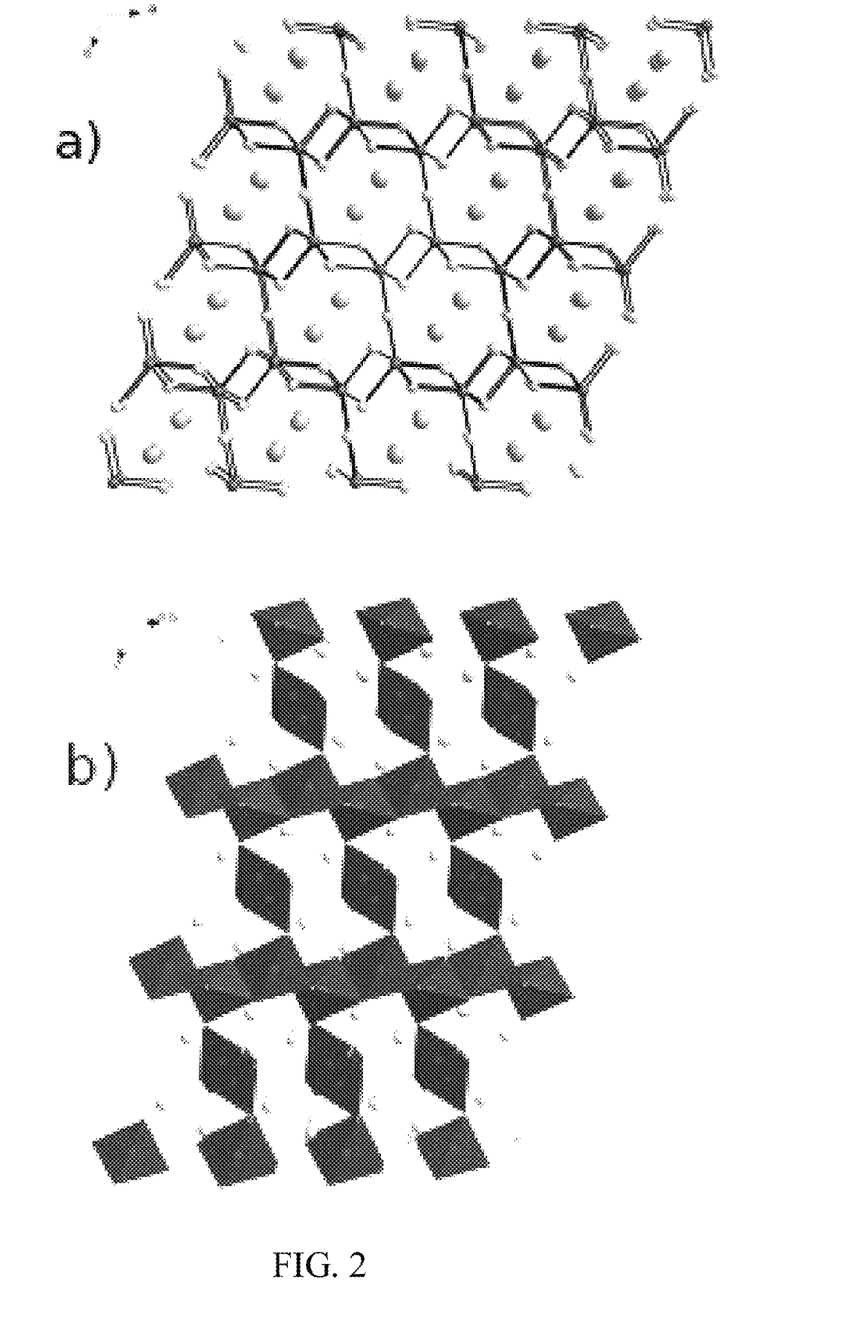

$K_2Sn_2S_5$ ("KTS-2") features only five-coordinate Sn centers, as shown in the structures of FIGS. 2(a) and 2(b). The anionic framework has $SnS_5$ distorted trigonal bi-pyramids as building blocks which share two of their common edges (formed by an axial S atom and an equatorial S atom) with one another to form $[SnS_3]_n^{2n-}$ chains running in the direction of [110] and [1-10], alternately. The $[SnS_3]_{2n}^{2n-}$ chains are cross-linked by sharing the remaining equatorial S atoms of the trigonal bipyramids to form an extended three-dimensional framework. The $(Sn_2S_5)^{2-}$ framework features 1D tunnels running parallel to the b-axis. These tunnels contain the $K^+$ atoms (FIG. 2).

Examples of other ternary sulfides having selective ion exchange properties are (a) $A_2Sn_3S_7$ compounds (A=Li, Na, K, Rb, Cs, or $[R_{4-x}NH_x]^+$, where R=an alkyl group, such as methyl, ethyl, propyl, butyl, and the like) and (b) $A_2Sb_4S_7$, (A=Li, Na, K, Rb, Cs, or $[R_{4-x}NH_x]^+$, where R=an alkyl group, such as methyl, ethyl, propyl, butyl, and the like.

Specific, non-limiting examples of ternary tin and antimony chalcogenides having the structure $A_xM_yQ_z$ include $K_2Sn_4S_{10}$, $Na_2Sn_4S_9$, $Na_2Sn_4S_{10}$, $K_2Sn_4S_{11}$, $K_2Sn_4S_{12}$, $K_2Sn_4S_{13}$, $K_2Sn_4S_{14}$, $K_2Sn_4S_{16}$, $K_2Sn_2S_6$, $K_2Sn_2S_7$, $K_2Sn_2S_8$, $K_2Sn_2S_{10}$, $K_2Sn_2S_{14}$, and $K_2Sn_2S_{20}$; $K_2Sb_8S_{13}$, $K_2Sb_4S_7$, $Na_2Sb_8S_{13}$, $Na_2Sb_4S_7$, $K_2Sb_8S_{15}$, $K_2Sb_4S_{10}$, $K_2Sb_8S_{18}$, $K_2Sb_4S_9$, $K_2Sb_8S_{20}$, and $K_2Sb_4S_{20}$. Other ternary chalcogenides having this structure include $KPS_7$, $K_2P_2S_8$, $KPS_{10}$, $K_2P_2S_{10}$, $NaPS_8$, $Na_2P_2S_{12}$, $NaPSe_{12}$, and $Na_2P_2Se_8$; $K_4Cu_2S_8$, $KCuS_5$, $K_4Cu_2S_{10}$, $KCuS_7$, $K_4Cu_2Se_8$, $KCuSe_5$, $K_4Cu_2Se_{10}$, and $KCuSe_7$; $K_4Zn_2S_8$, $K_2ZnS_4$, $K_4Zn_2S_{10}$, and $K_2ZnS_6$.

In some embodiments of the present invention, the compounds have the formula $B_xM_yQ_z$, where x and y can range from 1 to 9 (e.g., from 2 to 9) independently and z can range from 1 to 25. Certain categories within this group have x values or 1 or 2, y values in the range of 2 to 4, and z values in the range of 6 to 10. This class of compounds includes chalcogenides having the following formulas: $B_2Sn_2Q_z$, where z can range from 7 to 21; $BSn_2Q_z$, wherein z can range from 6 to 20; $BSn_4Q_z$, where z can range from 10 to 19; $B_2SnQ_z$, where z can range from 5 to 24; $BZnQ_z$, where z can range from 3 to 17; and $B_2Sb_2Q_z$, where z can range from 6 to 25.

Specific, non-limiting examples of ternary tin and antimony chalcogenides having the structure $B_xM_yQ_z$ include $CaSn_3S_7$; $CaSb_4S_7$; $Ca_2Sn_2S_6$; $Mg_2Sn_2S_6$; $Ca_2Sn_2S_6$; $Ca_2Sn_2S_8$; and $Ca_2Sn_2S_{10}$.

In some embodiments of the present invention, the compounds have the formula $(A_xB_{x'})M_yQ_z$, where x, x', and y can range from 1 to 9 (e.g., from 2 to 9) independently and z can range from 1 to 25. Certain categories within this group have x values of 4, x' values of 2, y values of 4, and z values of 12. Specific, non-limiting examples of ternary tin and antimony chalcogenides having the structure $(A \times Bx')M_yQ_z$ include $K_4Mg_2Sn_4S_{12}$; $Na_4Mg_2Sn_4S_{12}$; $Na_4Ca_2Sn_4S_{12}$; and $K_4Ca_2Sn_4S_{12}$.

The present compounds can be used as ion exchangers in nuclear waste management facilities. They can be also used for purification of waste water from industries producing electric lamps, gauges, batteries, chemicals, thermometers, and paper, as well as from mines where Hg is extracted (usually as HgS). In addition, they can be used by companies producing filters for the purification of drinking water. The spent mercury and heavy metal absorbents can be recycled through standard metal smelters.

In addition to removing metal ions from aqueous and non-aqueous fluids, the present compounds can be used to remove elemental metals from aqueous and non-aqueous fluids, such as from hydrocarbon-based liquids and gases. In some embodiments, the compounds can be used to remove elemental mercury from a liquid or a gas sample. This included embodiments in which chalcogenide-rich compounds are used to simultaneously remove heavy metal ions and elemental metal from a liquid or gas hydrocarbon sample. In these embodiments, the ionic metals and the elemental metals may be the same or different. By way of illustration only, the simultaneous removal of ionic and elemental mercury can be accomplished as follows:

Without being limited by a specific form, the chalcogenide materials can be used in a packed bed column or filter configuration. The purpose of a packed bed is typically to improve contact between two phases in a chemical or similar process. In this embodiment of chemical processing using the chalcogenide materials a packed bed can be a hollow tube, pipe, or other vessel that is filled with the chalcogenide materials and other support materials. The chalcogenide materials can be in particulate form, pelletized form or supported on an inert support.

Certain embodiments of the present compounds and their use in hazardous element remediation are illustrated in the following examples.

EXAMPLES

The following examples illustrate the use of the present chalcogenide compounds in metal remediation applications.

Example 1

Remediation of $Cs^+$ by $K_2Sn_4S_9$

Materials and Methods.

The chalcogenides were made by combining the potassium, tin and sulfur (or $K_2$ and $SnS_2$) in stoichiometric amounts and melting the resulting mixture at 500 to 700° C. Methods for making $K_2Sn_4S_9$ are described in greater detail in Marking et al., J. Solid State Chem. 1998, 141, 17-28, the entire disclosure of which is incorporated herein by reference.

Powder patterns were obtained using a CPS 120 INEL X-ray powder diffractometer with Ni-filtered Cu Kα radiation operating at 40 kV and 20 mA and equipped with a position-sensitive detector. Samples were ground and spread on a glass slide.

Figure 3:
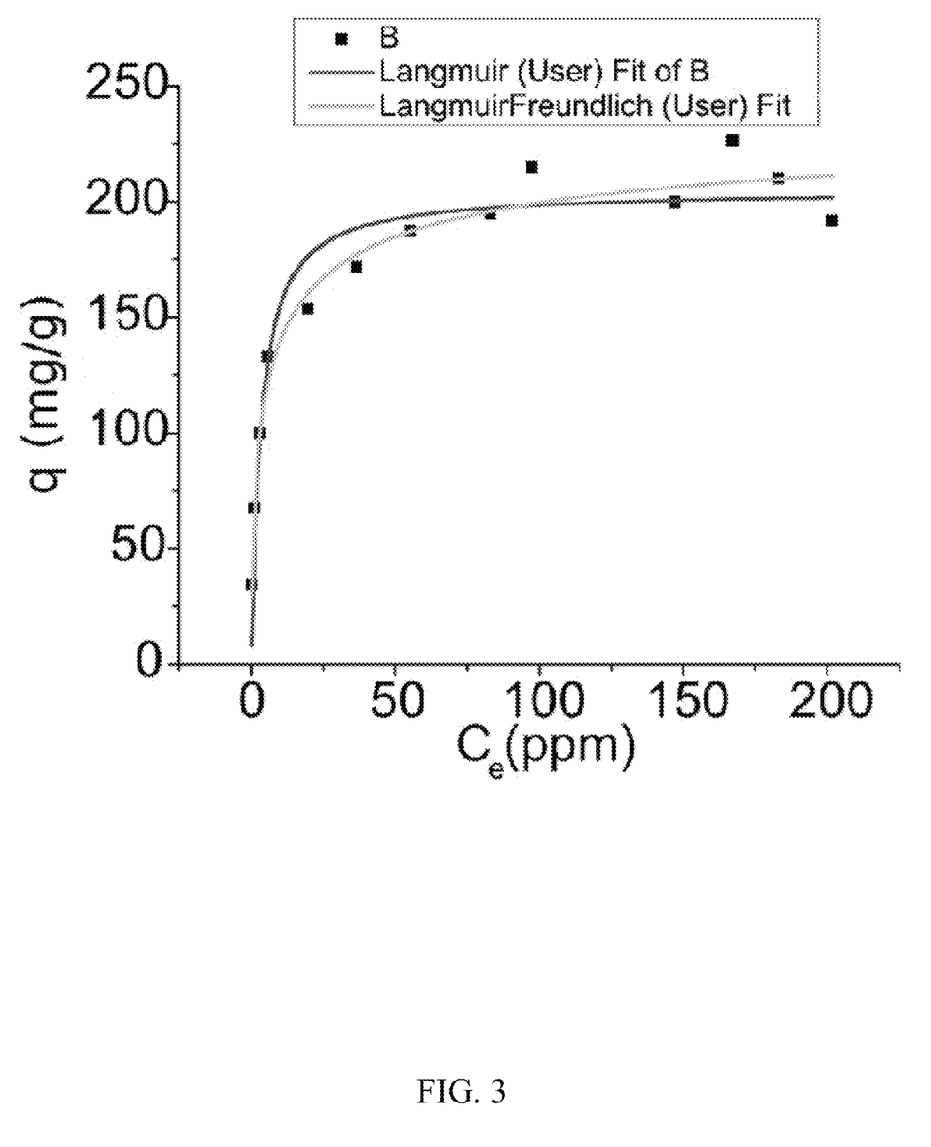
FIG. 3. Shows the equilibrium absorption capacity (q) data for $Cs^+$ ion exchange with $K_2Sn_4S_9$ (pH≈7, V/m 1000 mL/g, exposure time ~12 h, initial $Cs^+$ concentrations in the range 34 ppm to 347 ppm, in accordance with Example 1, below). The solid lines represent the fitting of the data with the models presented in Example 1.

The ion-exchange experiments were carried out with the batch method. A total of 10 mg of KTS-1 was weighted into a 20 ml glass vial. A 390 ppm solution of $Cs^+$ was made by weighing out 49.78 mg of CsCl and diluting it into a 100 mL volumetric flask with deionized water; 10 mL of this was added to the glass vial. For subsequent reactions, the initial $Cs^+$ concentration ($C_o$) was diluted by combining x mL of 390 ppm $Cs^+$ solution to y mL of deionized water in the vial where x+y=10 mL. To each vial a magnetic stir bar was added and the reactions were stirred overnight between 10-15 hours. The stir bars were then removed, and the vials were centrifuged (3980 rpm for 20 minutes). The supernatant was decanted into a centrifuge tube through a filter to collect any excess particles. The centrifuge tube was then centrifuged again (3980 rpm for 20 minutes) and the supernatant was removed by pipette into a new, labeled centrifuge tube for analysis. The determination of the ionic content of the solutions after the ion exchange processes ($C_e$) were conducted by Inductively Coupled Plasma-Mass Spectroscopy (ICP-MS). Standards in the range 1-40 ppb were prepared. Each experiment was performed in triplicate. The reactions with potable water samples, to which trace concentrations of Cs were added, were carried out similarly as the reactions with the neutral solutions. The results of the ion exchange studies are shown in Table 1 and the measured exchange capacities are shown in FIG. 3.

TABLE 1

Ion-Exchange of $K_2Sn_4S_9$ with $Cs^+$ (V/m = 1000 mL/g, Reaction time ~15 hrs).

| Sample | $C_o$ (ppb) | $C_e$ (ppb) | % $Cs^+$ Removal (by weight) | $K_d$ (mL/g) | Exchange Capacity, q (mg Cs/g KTS-1) |
|---|---|---|---|---|---|
| 1 | 34375 | 132.5 | 99.6 | 258434 | 34.2 |
| 2 | 68750 | 1162.5 | 98.3 | 58140 | 67.6 |
| 3 | 103125 | 3067.5 | 97 | 32619 | 100.1 |
| 4 | 138750 | 5805 | 95.8 | 22902 | 132.9 |
| 5 | 173438 | 19570 | 88.7 | 7862 | 153.9 |
| 6 | 208125 | 36375 | 82.5 | 4722 | 171.8 |
| 7 | 242813 | 55287.5 | 77.2 | 3392 | 187.5 |
| 8 | 277500 | 82962.5 | 70.1 | 2344 | 194.5 |
| 9 | 312188 | 97325 | 68.8 | 2208 | 214.9 |
| 10 | 346875 | 147000 | 57.6 | 1360 | 199.9 |
| 11 | 393375 | 201500 | 48.8 | 952 | 191.9 |
| 12 | 393375 | 183125 | 53.5 | 1148 | 210.3 |
| 13 | 393375 | 167000 | 57.6 | 1356 | 226.4 |

Maximum initial Cs concentration used corresponded to ~2.6 equivalents in relation to $K_2Sn_4S_9$. Model exchange capacities for the compounds (solid lines in FIG. 3) were calculated using Langmuir-Freundlich and Langmuir equations as shown below:

Equation Langmuir-Freundlich:

$$q = q_m \frac{(bC_e)^{\frac{1}{n}}}{1 + (bC_e)^{\frac{1}{n}}}$$

Adj. R-Square 0.966, $q_m$=243(23) mg/g; b=0.18(8) L/mg; n=1.9(4).

Equation Langmuir:

$$q = q_m \frac{bC_e}{1 + bC_e}$$

Adj. R-Square 0.931; $q_m$=205(6) mg/g; b=0.32(7) L/mg.

The theoretical absorption capacity for exchange of all K by Cs is equal to 316 mg Cs/g of KTS-1. The maximum experimental absorption capacity found was ~205-243 mg, i.e. the ⅔ of the theoretical capacity. This means that ~70% of all K can be exchanged by Cs.

Figure 4:
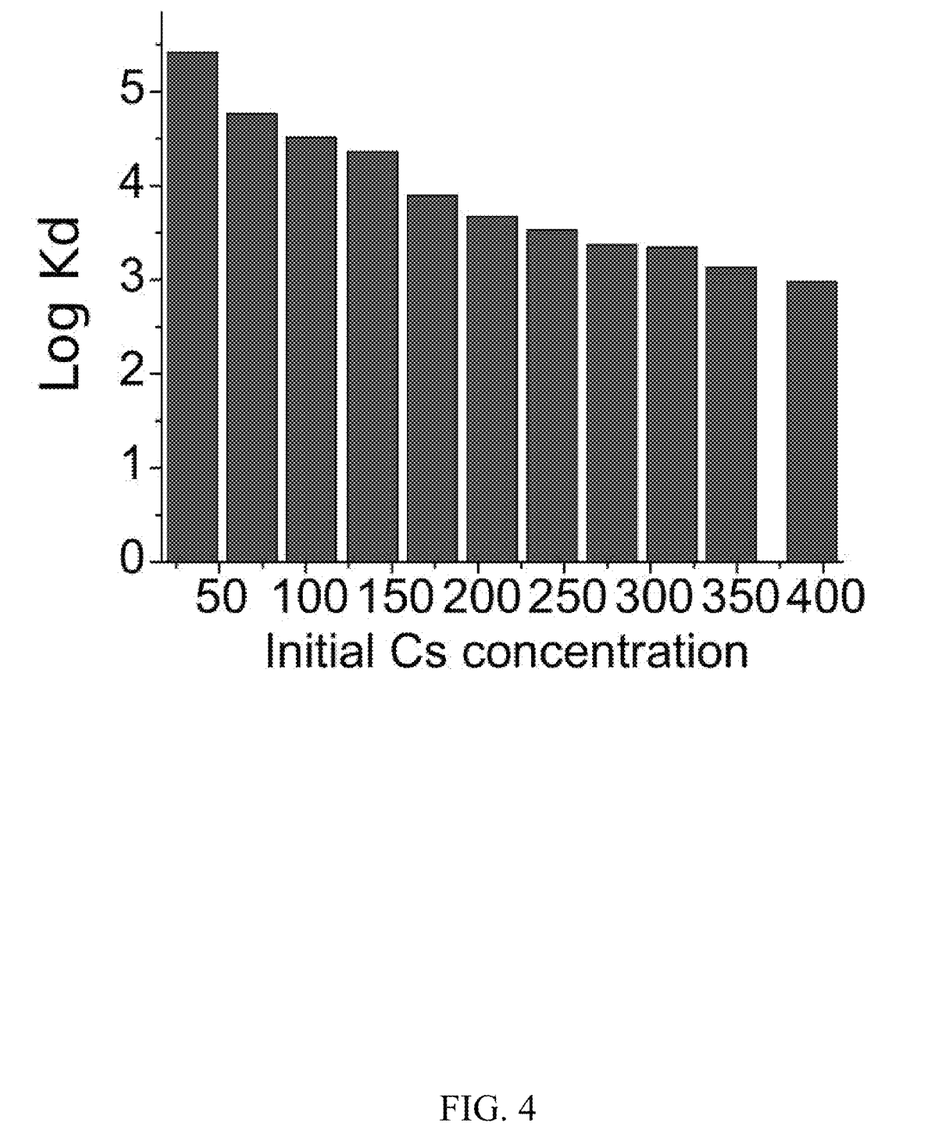
FIG. 4. Shows the Log of $K_d$ values as a function of initial Cs concentration, in accordance with Example 1, below. These are very high—in the range of $1.3 \times 10^3$-$2.5 \times 10^5$ mL/g, which demonstrates the usefulness of KTS-1 for $Cs^+$ ion-exchange.

FIG. 4 shows the log $K_d$ values as a function of the initial Cs concentration.

Compared to KMS-1, KTS-1 has similar exchange capacity but higher affinity for Cs (higher $K_d$ values and higher Langmuir constant b~0.32 L/mg for KTS-1 vs. 0.07 L/mg for KMS-1).

Example 2

Remediation of $Hg^{2+}$, $Cd^{2+}$, $Pb^{2+}$, $Cs^+$ and $Sr^{2+}$ by $K_2Sn_4S_9$ and $K_2Sn_2S_5$ Materials and Methods.

Methods for making $K_2Sn_4S_9$ are described in detail in Marking et al., *J. Solid State Chem.* 1998, 141, 17-28, the entire disclosure of which is incorporated herein by reference. Methods of making $K_2Sn_2S_5$ are described in detail in Liao et al., *Inorg. Chem.* 1993, 32, 2453-2462, the entire disclosure of which is incorporated by reference.

The ion-exchange experiments were carried out with the batch method. A total of 10 mg of KTS (1 or 2) was weighted into a 20 ml glass vial. Solutions of 2.5-3 molar equivalents (when compared to KTS-1 or KTS-2) of $HgCl_2$, $PbCl_2$, $SrCl_2$, $CdCl_2$, and CsCl were made. 20 mg of the KTS-1 or KTS-2 samples were weighed out into a 20 mL vial. 10 mL of the aforementioned solutions were added to the vial along with a magnetic stir bar. The reactions were stirred overnight between 10-15 hours. The stir bars were then removed, and the vials were centrifuged (3980 rpm for 20 minutes). The supernatant was decanted into a centrifuge tube through a filter to collect any excess particles. The vials were then washed with water and centrifuged two more times. Finally, the system was washed once with acetone, centrifuged and decanted again. The samples were left to dry in a dessicator. The solids isolated with the filtration were analyzed with energy dispersive spectroscopy (EDS) (Cs, Sr, Hg, Pb, Cd-exchanged materials). Each experiment was performed in triplicate.

The EDS analyses were performed using a JEOL JSM-6400V scanning electron microscope (SEM) equipped with a Tracor Northern EDS detector. Data acquisition was performed with an accelerating voltage of 25 kV and 60 s accumulation time.

The results of the ion exchange studies are shown in Table 2.

TABLE 2

Ion-exchange of $K_2Sn_4S_9$ and $K_2Sn_2S_5$ with heavy metal ions ($Hg^{2+}$, $Cd^{2+}$, $Pb^{2+}$, $Cs^+$ and $Sr^{2+}$) analyzed by SEM-EDS.

| Ions Exchanged | Results for KTS-1 ($K_2Sn_4S_9$) | Results for KTS-2 ($K_2Sn_2S_5$) |
|---|---|---|
| Hg(II) | Exchanged, $Hg_1Sn_4S_9$ | Exchanged, $Hg_2Sn_2S_5Cl_2$ |
| Cd (II) | Exchanged, $Cd_1Sn_4S_9$ | Exchanged: $Cd_1Sn_2S_5$ |
| Pb(II) | Exchanged, $Pb_1Sn_4S_9$ | Exchanged: $Pb_1Sn_2S_5$ |
| Cs (I) | Exchanged, $Cs_2Sn_4S_9$ | Exchanged: $Cs_2Sn_2S_5$ |
| Sr(II) | Exchanged, $Sr_1Sn_4S_9$ | Exchanged: $Sr_1Sn_2S_5$ |

Example 3

Remediation of Elemental Hg from Hydrocarbon Liquid Using $K_2Sn_4S_{14}$

Materials and Methods.

Preparation of $K_2Sn_4S_{14}$: An amount of 1.10 g of $K_2S$, 4.72 g of Sn and 4.1 g of S were mixed in a fused silica tube and the tube was evacuated to $10^{-3}$ Torr. The tube was heated to 700-800° C. using a programmable furnace to produce a liquid. The molten liquid was then pulled out of the furnace and cooled in air. The resulting material $K_2Sn_4S_{14}$ may be crystalline or amorphous or a combination of the two forms. $K_2Sn_4S_{15}$, $K_2Sn_4S_{18}$, $K_2Sn_4S_{20}$, and the like, can be prepared similarly by adding additional amounts of sulfur in the reaction.

The Hg capture experiments were carried out with the batch method. A total of 10 mg of $K_2Sn_4S_{16}$ was weighted into a 20 ml glass vial. A solution of Hg in hexane was made at a concentration of 1220 ppb Hg metal. A volume of 50 ml hexane was used in each experiment. An amount of 45 mg of $K_2Sn_4S_{16}$ sample was added to the vial containing the Hg hexane solution. The reactions were stirred overnight for a period of 10-15 hours. The solid material was isolated by filtration and was washed once with hexane. The solid samples were left to dry in a dessicator. The solids isolated from the filtration were weighed and then analyzed with energy dispersive spectroscopy (EDS) (Hg containing materials) using a JEOL JSM-6400V scanning electron microscope (SEM) equipped with a Tracor Northern energy dispersive spectroscopy (EDS) detector. Data acquisition was performed with an accelerating voltage of 25 kV and 40 s accumulation time. Each experiment was performed in triplicate. The recovered solid material contained Hg along with K, Sn and S. Removal of Hg was observed to be at least 98%.

Example 4

Remediation of $Hg^{2+}$ Using $BaSnS_x$

Materials and Methods.

An amount of 3 mmol (0.714 g) of $K_2S_5$ was dissolved in 30-40 ml of water. To this yellow orange solution 1 mmol (0.260 g) of $SnCl_4$ were added and this was followed by the addition of 1 mmol (0.262 g) solution of $Ba(NO_3)_2$ dissolved in 5 ml water. The mixture was distilled and the precipitate was collected by filtration. Yield was >90% based on $SnCl_4$. Energy dispersive spectroscopy (EDS) elemental analysis on the yellow orange product indicated $BaSnS_x$: where x=12-15.

In this experiment the $Hg^{2+}$ ions were exchanging with $Ba^{2+}$ ions. A typical ion-exchange experiment of $BaSnS_{15}$ with $Hg^{2+}$ ions is as follows: In a solution of $Hg(NO_3)_2$ (1.0 mmol) in 50 ml water, compound $BaSnS_{15}$ (1 mmol, 737 mg) was added as a solid. The mixture was kept under magnetic stirring or constant shaking for ≈2-12 h. Then, the dark brown or black material was isolated by filtration, washed several times with water, acetone and ether and dried in air. In all cases, the ion-exchange was completed after only one cycle. The removal of Hg ions from solution is quantitative.

Example 5

Simultaneous $Hg^{2+}$ and $Co^{2+}$ Removal Via Ion Exchange with $Na_4Mg_2Sn_4S_{12}$ Materials and Methods.

A mixture of Sn (1.9 mmol, 226 mg), Mg (1.1 mmol, 26 mg), $Na_2S$ (2 mmol, 156 mg), and S (5.2 mmol, 167 mg) was sealed under vacuum ($10^{-4}$ Torr) in a silica tube and heated (50° C./h) to 670° C. for 48 h, followed by cooling to room temperature at 100° C./h. The excess salts were removed with water to reveal yellow polycrystalline material $K_4Mg_2Sn_4S_{12}$. The yield for this preparation exceeds 90% based on Sn as the limiting reagent. The same procedure can be followed for the synthesis of $K_4Mg_2Sn_4S_{12}$ and $Na_4Ca_2Sn_4S_{12}$.

Powder of $Na_4Mg_2Sn_4S_{12}$ (180 mg, 0.18 mmol) was placed in an aqueous solution (10 ml) of $Hg(NO_3)_2$ and $Co(NO_3)_2$ (0.8 mmol each). The mixture was then stirred for 24 h. The powder turned black from yellow in color and it was isolated with filtration, washed several times with water, acetone and ether. The total weight of solid after drying was 0.210 g. Energy dispersive spectroscopy (EDS) elemental analysis on the black product revealed the average formula corresponding to "$Hg_{1\pm x}Co_{1\pm x}Mg_2Sn_4S_{12}$" (x=0.1) indicating nearly equal pick-up of Hg and Co ions. Based on the $Na_4Mg_2Sn_4S_{12}$ formula the removal of both Hg and Co ions was quantitative.

Example 6

Synthesis of Other Chalcogenides

Example preparation of $K_2Sb_4S_7$: An amount of 1.10 g of $K_2S$, 4.81 g of Sb and 1.9 g of S were mixed in a fused silica tube and the tube was evacuated to $10^{-3}$ Torr. The tube was heated to 600-800° C. using a programmable furnace to produce a liquid. The molten liquid was then pulled out of the furnace and cooled in air. The resulting material $K_2Sb_4S_7$ may be crystalline or amorphous or a combination of the two forms. $K_2Sb_4S_8$, $K_2Sb_4S_{10}$, $K_2Sb_4S_{14}$, and the like, can be prepared similarly by adding additional amounts of sulfur in the reaction.

Example preparation of $CaSnS_6$: An amount of 0.72 g of CaS, 1.2 g of Sn and 1.6 g of S were mixed in a fused silica tube and the tube was evacuated to $10^{-3}$ Torr. The tube was heated to 600-880° C. using a programmable furnace to produce a liquid. The molten liquid was then pulled out of the furnace and cooled in air. The resulting material $CaSnS_6$ may be crystalline or amorphous or a combination of the two forms. $CaSnS_7$, $CaSnS_8$, $CaSnS_{10}$, and the like, can be prepared similarly by adding additional amounts of sulfur in the reaction.

Example preparation of $K_4Mg_2Sn_4S_{12}$: An amount of 2.22 g of $K_2S$, 4.71 g of Sn, 0.46 g and 3.5 g of S were mixed in a fused silica tube and the tube was evacuated to $10^{-3}$ Torr. The tube was heated to 700-850° C. using a programmable furnace to produce a solid. The material can be isolated by either cooling the furnace to room temperature over the course of 2-6 hours or by quenching in air by pulling the silica tube out of the furnace. The material $K_4Mg_2Sn_4S_{12}$ is crystalline.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art, all language such as "up to," "at least," "greater than," "less than," and the like includes the number recited and refers to ranges which can be subsequently broken down into subranges as discussed above. Finally, as will be understood by one skilled in the art, a range includes each individual member.

It is specifically intended that the present invention not be limited to the embodiments and illustrations contained herein, but include modified forms of those embodiments including portions of the embodiments and combinations of elements of different embodiments as come within the scope of the following claims.

What is claimed is:

1. A method comprising:
    exposing a fluid sample comprising a metal to a chalcogenide compound having the formula $(A_xB_{x'})M_yQ_z$, where A is an alkali cation or an alkylammonium cation; B is an alkaline earth cation; M is Sn, Zn, P, Cu or Sb; and Q is S or Se, wherein the values of x, y and z can be the same or different; x, x' and y can range, independently, from 0 to 9, provided that if one of x and x' is zero, the other is not; and z can range from 1 to 25, whereby the chalcogenide compound absorbs the metal; and
    removing the absorbed metal from the fluid sample, wherein the metal is an elemental metal.

2. The method of claim 1, wherein the metal is mercury.

3. The method of claim 2, wherein the fluid sample comprises a liquid hydrocarbon.

4. The method of claim 3, wherein the metal is mercury and the liquid hydrocarbon is petroleum or crude oil.

5. The method of claim 1, wherein the fluid sample comprises natural gas.

6. A method comprising:

exposing a fluid sample comprising a metal to a chalcogenide compound having the formula $A_xM_yQ_z$, wherein A is an alkali cation; M is Sn, Zn, P, Cu or Sb; and Q is S or Se, wherein x and y are in the range from 1 to 9, and z is in the range from 1 to 25, whereby the chalcogenide compound absorbs the metal; and removing the absorbed metal from the fluid sample.

7. The method of claim 6, wherein x is 1 or 2, M is Sn or Sb; y is 2, 4 or 8; and z is in the range from 6 to 23.

8. The method of claim 6, wherein the chalcogenide compound has a formula selected from the group consisting of $A_2Sn_4S_9$, $A_2Sn_2S_5$, $A_2Sn_3S_7$, and $A_2Sb_4S_7$, and A is selected from the group consisting of Li, Na, K, Rb, and Cs.

9. The method of claim 6, wherein the metal comprises Cs or Sr radionuclide ions.

10. The method of claim 6, wherein at least 90 percent by weight of the metal is removed from the fluid sample.

11. The method of claim 6, wherein at least 98 percent by weight of the metal is removed from the fluid sample.

12. A method comprising:

exposing a fluid sample comprising a metal to a chalcogenide compound having the formula $B_xM_yQ_z$, wherein x and y are in the range from 1 to 9 and z is in the range from 1 to 25, where B is an alkaline earth cation; M is Sn, Zn, P, Cu or Sb; and Q is S or Se, wherein the values of x, y and z can be the same or different, whereby the chalcogenide compound absorbs the metal; and removing the absorbed metal from the fluid sample.

13. The method of claim 12, wherein x is 1 or 2, M is Sn or Sb, y is 2 or 4, and z is in the range of 5 to 25.

14. A method comprising:

exposing a fluid sample comprising a metal to a chalcogenide compound selected from the group consisting of $A_2Sn_4S_z$, $BSnS_z$, and $A_4B_2Sn_4S_{12}$, where A is an alkali cation or an alkylammonium cation; B is an alkaline earth cation; and where z is in the range from 4 to 25, whereby the chalcogenide compound absorbs the metal; and removing the absorbed metal from the fluid sample.

15. A method comprising:

exposing a fluid sample comprising an elemental metal to a chalcogenide compound having the formula $(A_xB_{x'}')M_yQ_z$, where A is an alkali cation or an alkylammonium cation; B is Ca, Sr or Ba; M is Sn, Zn, P, Cu or Sb; and Q is S or Se, wherein the values of x, y and z can be the same or different; x, x' and y can range, independently, from 0 to 9, provided that if one of x and x' is zero, the other is not; and z can range from 1 to 25, whereby the chalcogenide compound absorbs the elemental metal; and removing the absorbed elemental metal from the fluid sample.

16. The method of claim 15, wherein the fluid sample comprises both ionic and elemental metal and further wherein ionic and elemental metal are removed simultaneously from the fluid sample.

* * * * *